(12) United States Patent
Bortolussi et al.

(10) Patent No.: US 10,729,076 B2
(45) Date of Patent: Aug. 4, 2020

(54) MOVABLE STAKE AND METHOD FOR SUPPORTING AND TRAINING ONE OR MORE BRANCHES IN PLANT CULTIVATION

(71) Applicants: Claudio Bortolussi, Fiume Veneto (IT); Franco Bortolussi, Fiume Veneto (IT)

(72) Inventors: Claudio Bortolussi, Fiume Veneto (IT); Franco Bortolussi, Fiume Veneto (IT)

( * ) Notice: Subject to any disclaimer, the term of this patent is extended or adjusted under 35 U.S.C. 154(b) by 124 days.

(21) Appl. No.: 15/545,898

(22) PCT Filed: Feb. 6, 2015

(86) PCT No.: PCT/IB2015/050900
§ 371 (c)(1),
(2) Date: Jul. 24, 2017

(87) PCT Pub. No.: WO2016/124981
PCT Pub. Date: Aug. 11, 2016

(65) Prior Publication Data
US 2018/0000020 A1 Jan. 4, 2018

(51) Int. Cl.
*A01G 9/12* (2006.01)
*A01G 17/10* (2006.01)

(52) U.S. Cl.
CPC ............. *A01G 9/122* (2013.01); *A01G 17/10* (2013.01)

(58) Field of Classification Search
CPC .......... A01G 9/122; A01G 9/12; A01G 9/128; A01G 17/04; A01G 9/124; A01G 17/10; A01G 13/0237; A01G 13/0268; A01G 13/02; A01G 13/0281; A01G 13/0275; A01G 9/1438; A01G 13/0231; A01G 13/0293; A01G 17/06; A01G 13/0262; A01G 13/04; A01G 17/02; A01G 13/00;
(Continued)

(56) References Cited

U.S. PATENT DOCUMENTS 155,995 A * 10/1874 Tillinghast .............. A01G 9/12
47/70
3,199,520 A * 8/1965 Cawood ................... E02D 5/80
135/118
(Continued)

FOREIGN PATENT DOCUMENTS

KR 20120138356 A 12/2012
SU 1316597 A1 6/1987

OTHER PUBLICATIONS

Oct. 16, 2015 Search Report issued in International Patent Application No. PCT/IB2015/050900.
(Continued)

*Primary Examiner* — Peter M Poon
*Assistant Examiner* — Jeffrey R Larsen
(74) *Attorney, Agent, or Firm* — Oliff PLC

(57) ABSTRACT

Movable stake and method of using it for supporting and managing the cultivation of plant species, such as a vineyard or the like, in which at least one part of the branches are buried in the soil during the cold season. The movable stake includes a deformable element on which are fastened the branches to be buried and has a first free end and a second end anchored to the ground; the first free end is suitable to be engaged either with the soil or with a horizontal wire that supports the branches of the plant being cultivated.

3 Claims, 4 Drawing Sheets

(58) Field of Classification Search
CPC ..... A01G 13/025; A01G 13/0287; Y02A 40/284;
Y02A 40/264
USPC .................................................. 47/9, 47, 44
See application file for complete search history.

(56) References Cited

U.S. PATENT DOCUMENTS

| | | | | |
|---|---|---|---|---|
| 3,637,023 | A * | 1/1972 | Wood ..................... | A01D 29/00 171/1 |
| 5,557,883 | A * | 9/1996 | Walker ................... | A01G 17/06 47/46 |
| 6,021,601 | A * | 2/2000 | Weathers ............... | A01G 17/10 248/499 |
| 2006/0283082 | A1* | 12/2006 | Stevenson, III ....... | A01G 9/124 47/70 |
| 2018/0177141 | A1* | 6/2018 | Lamoureux ........ | A01G 13/0231 |

OTHER PUBLICATIONS

Oct. 16, 2015 Written Opinion issued in International Patent Application No. PCT/IB2015/050900.

* cited by examiner

MOVABLE STAKE AND METHOD FOR SUPPORTING AND TRAINING ONE OR MORE BRANCHES IN PLANT CULTIVATION

TECHNICAL FIELD OF INVENTION

The present invention is relative to a device suitable to be used in plant cultivation for supporting and training one or more branches, so as to change their position based on the succession of the seasons in the course of the year, for the purpose of protecting them from freezing weather during the cold seasons and of allowing their managed and guided growth in the warm seasons.

BACKGROUND OF THE INVENTION

The cultivation of plant species sensitive to cold weather entails the use of methods designed to preserve the productive capabilities of the plants. In this scope are included plantations, such as vineyards and the like, practised in countries with cold winters or in places at high elevations.

The method provides for the growth of one or more branches that are allowed to grow either with the main trunk or as main branches on their own in the absence of a main trunk; in cold periods said branches are buried so as to be protected from freezing weather in order that they can eventually be ready to take the place of said main trunk if the latter is damaged by bad weather conditions, or else to sprout anew in the warm season in the case in which they are all main branches. This method can be used for a period that generally extends from one to five years, depending on the plant species, that is, until the hard woody consistency of the branches makes them susceptible to be broken during the bending operations.

In current practices, during the warm months, the branches are fastened in similar manner as the main trunk to support structures consisting of vertical posts that support horizontal wires. As the cold season approaches, the branches are released from the horizontal carrying wires or from the support stakes, they are placed on the ground so as to lie as much as possible parallel to the direction of the row of vines, and are covered with soil by the action of a plough drawn by a tractor. The operation with the plough, when carrying out the procedure according to the prior art method, must necessarily be performed on both sides of the row of plants to guarantee a suitable covering of said branches, and may generally require the work of operators to hold the branches being covered in a fixed position with the help of metal forks inserted into the ground so as to straddle the branches themselves.

At the end of the cold season, the branches must be returned to their initial position and secured to the horizontal carrying wire through the possible help of the current support stakes to which the branches are fastened.

The restoration process, according to the prior art, requires the removal of the soil that was previously piled up, through the use of a plough that returns the soil into the open furrows during the burying step, and the subsequent passage with blowing means or manual implements to remove the part of the soil nearest to the branches which, to protect the branches, cannot be removed with the plough.

The procedure is completed manually with the removal of the remaining soil, the metal forks, and by securing the branches to a horizontal carrying wire by tying them to the relative support stakes.

SUMMARY OF THE INVENTION

The objective of the invention specified hereunder is to propose a movable stake to support and manage the growth of one or more branches of a plant cultivation, so as to facilitate and accelerate the operations required for burying the branches underground for the winter and for returning them to the open air at the end of the cold season. The invention is particularly suitable to be used in vineyards.

The movable support stake for the branches facilitates the growth of the branches themselves, being firmly secured thereto, and makes it so that the branches are not damaged during the mechanical operations carried out to bury them and then to extract them, without the necessity of untying and freeing the branches from the stakes or from the horizontal wires, in order to lay the branches horizontally on the ground.

This objective is achieved with the movable stake, the characteristics of which are defined in the claims given at the end of the present description.

BRIEF DESCRIPTION OF THE FIGURES

The technical characteristics of the invention will be described with the help of the enclosed figures, which illustrate an embodiment of the same purely by way of a non-limiting example, wherein.

DETAILED DESCRIPTION OF THE INVENTION

Figure 1:
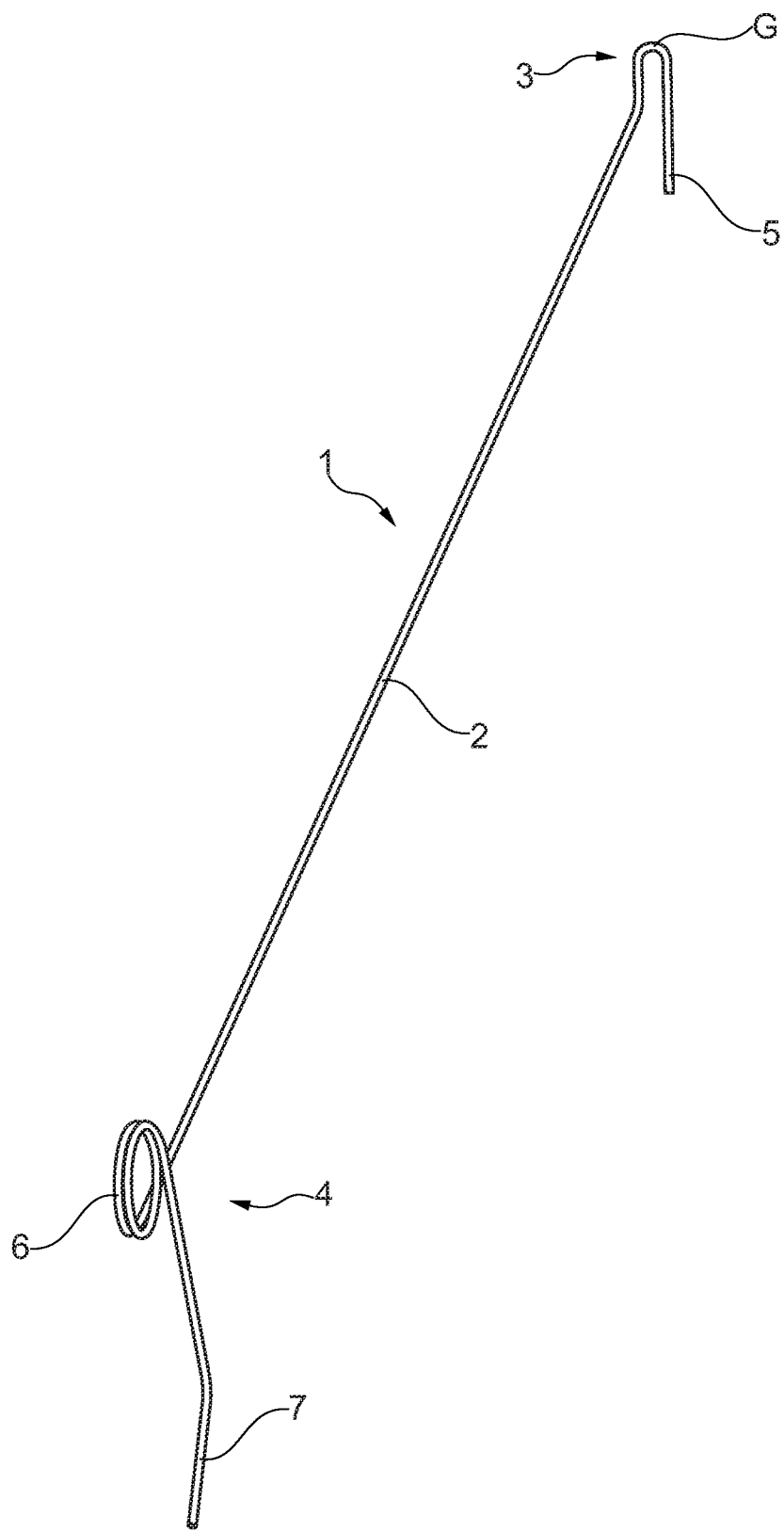
FIG. 1 shows a perspective view of the movable stake to be used to support and train the branches of a plant cultivation.

An embodiment of a movable stake 1 to support and train the branches 9 of a plant cultivation, such as a vineyard or the like, is shown in the perspective view of FIG. 1.

The movable stake 1 according to the invention consists of an elastically or mechanically deformable element, preferably made of steel, having a rectilinear elongate body 2 and shaped ends 3 and 4.

The deformable element is preferably a metal rod or wire having an elastic behaviour; naturally, it can also be made up entirely of a completely flexible element of metallic material or fibre composite.

A first end 3 of the movable stake 1 is shaped as a hook G to be engaged on a horizontal wire 11 supporting the vegetation and ends preferably as a harpoon 5 suitable to be sunk into the ground to prevent sideway shifts of the movable stake 1 with respect to the longitudinal direction of the plant row. A second end 4 may be in a form such as to enhance the deformability of the stake, such as for example a coil spring 6 or a ribbon spring, suitable to allow the elastic rotation of the movable stake 1 between the two positions of engaging the wire or of burying the branches, respectively.

Figure 6:
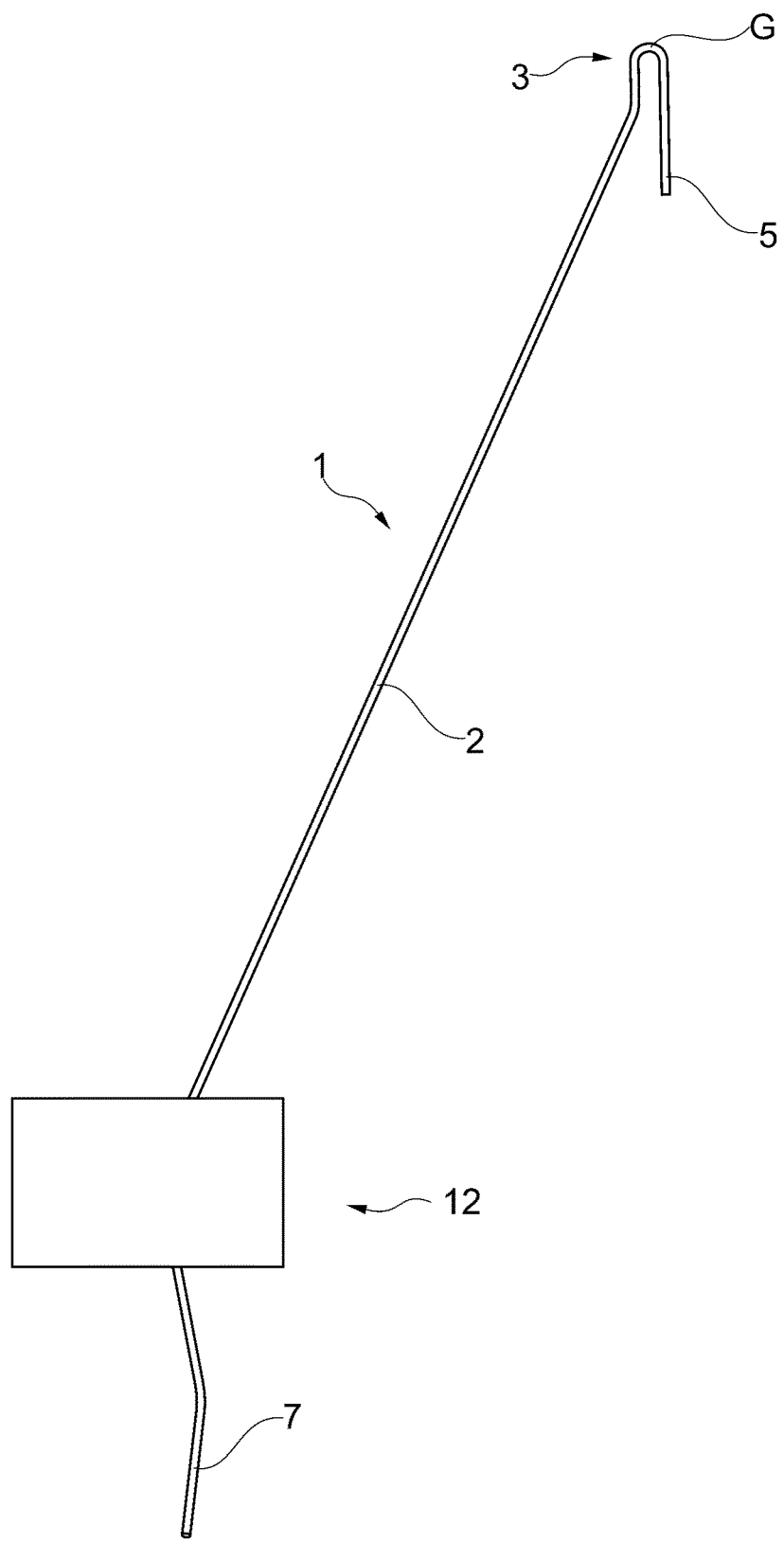
FIG. 6 shows a perspective view of a movable stake to be used to support and train the branches of a plant cultivation in accordance with a variant embodiment.

As shown in FIG. 6, a variant embodiment that makes it possible to achieve the same objective is represented by a stake consisting of two joined parts, connected for example through a hinge, rings or eyelets 12.

Said second end 4 terminates with a harpoon 7 that ensures a stable anchoring of the movable stake 1 in the ground; the harpoon 7 is preferably bent at an angle so as to counteract with a resisting moment the forces that, during the burying operations, could rotate the movable stake 1 with respect to the longitudinal direction of the row of plants.

The movable stake 1 is installed near the base of the trunk of a plant, in particular a grape vine 8, as shown in FIGS. 2-5, by driving the harpoon 7 into the ground. On the rectilinear elongate body 2 of said movable stake 1 are secured the branches 9 through known means, such as for example tie fasteners 10.

Depending on the plant species, the cultivation may allow for the growth of a plurality of branches. In this case, near the base of the main trunk 8, are installed a number of movable stakes 1, or the cultivation may provide for the growth and management of only the branches that are above the grafting level on the plant.

In the warm period, the movable stake 1 engages said supporting horizontal wire 11 (FIG. 2) with the harpoon 5 so as to keep the branches 9 raised above the ground and in a suitable position for their growth.

The movable stake 1 and the branches 9 remain in this position until the onset of the winter period.

Figure 3:
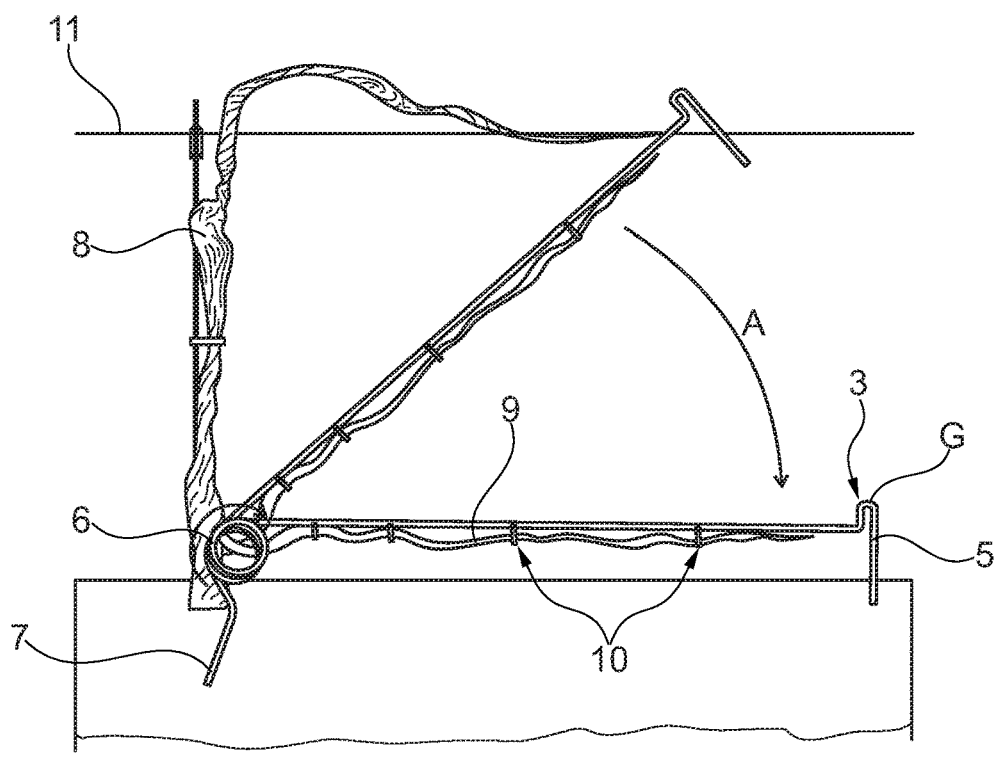
FIG. 3 illustrates a schematic side view of the part of the vineyard of FIG. 2 in which is shown the operation for positioning and fastening the branches to the ground together with the movable stake.

The arrow A in FIG. 3 shows the rotation applied on the branches 9 and the movable stake 1 during the burial operation, carried out with the approach of the cold period.

In the course of this procedure, an operator releases the harpoon 5 from the supporting horizontal wire 11 and directs the branches 9 fastened to the movable stake 1 until they reach the ground; the operator completes the procedure by pushing down said first free end 3 so that said harpoon 5 is driven into the ground.

The winter burial procedure is completed with the help of a machine which, drawing a plough along the vine row, moves the soil so as to cover the branches 9 fastened to the movable stake (FIG. 3).

The use of the movable stake 1 allows a more accurate alignment of the branches 9 by reducing the width of the ridge of soil created with the piled-up soil. Consequently, it is sufficient to create a ridge of soil of limited size to protect the branches, thus cutting the necessary working times.

Figure 4:
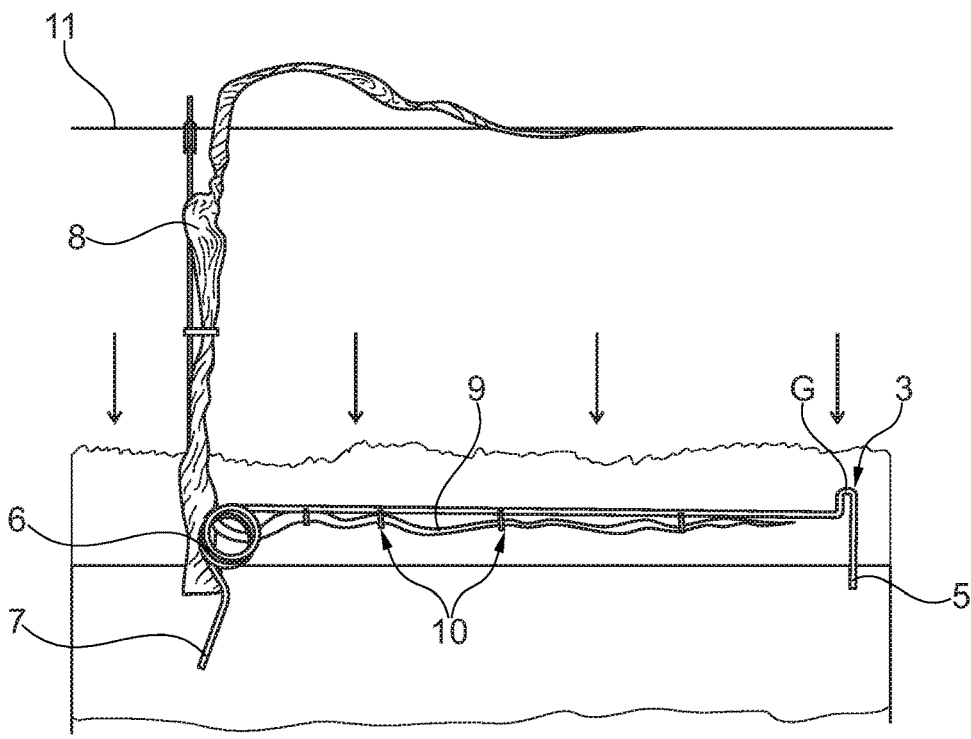
FIG. 4 shows a schematic side view of the part of the vineyard of FIG. 2 in which are shown the branches and the movable stake completely buried.

During the cold period, as shown in FIG. 4, the branches 9 lie covered under a layer of soil. The branches thus protected, in the case in which the main branch 8 is compromised by the rigid winter conditions, can be used to completely replace said main branch or to contribute with their own buds to avoid drops in production, or, in the case of single branches they can survive the rigid climate and sprout again in the following season.

Figure 5:
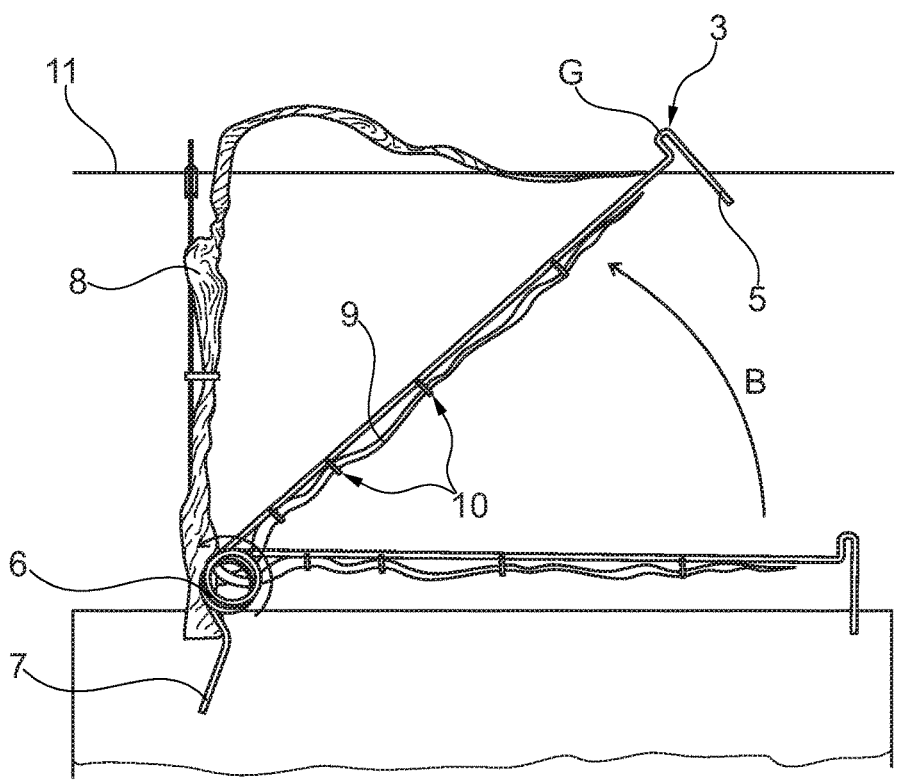
FIG. 5 illustrates a schematic side view of the part of the vineyard of FIG. 2 in which is shown the operation for extracting the branches from the ground and coupling them to a support wire.

At the end of the cold period, the branches 9 are dug out of the soil bed and fastened to the supporting horizontal wire 11 so as to resume their normal growth (FIG. 5). Thanks to the presence of the movable stake 1, the restoration procedures can be carried out in a simple and rapid manner compared to those carried out according to the prior art, without having to tie the branches again to the current support stakes.

After having loosened the soil bed by means of a plough, it is sufficient to perform a single passage along the edge of the plant row with a blowing machine or hand implements so as to remove only the part of the layer of soil that protected the branches 9 and proceed manually to lift said branches 9. In FIG. 5, the arrow B shows the rotation applied to the movable stake 1 and to the branches 9 so as to engage the first free end 3 of said movable stake 1 on the supporting horizontal wire 11.

Figure 2:
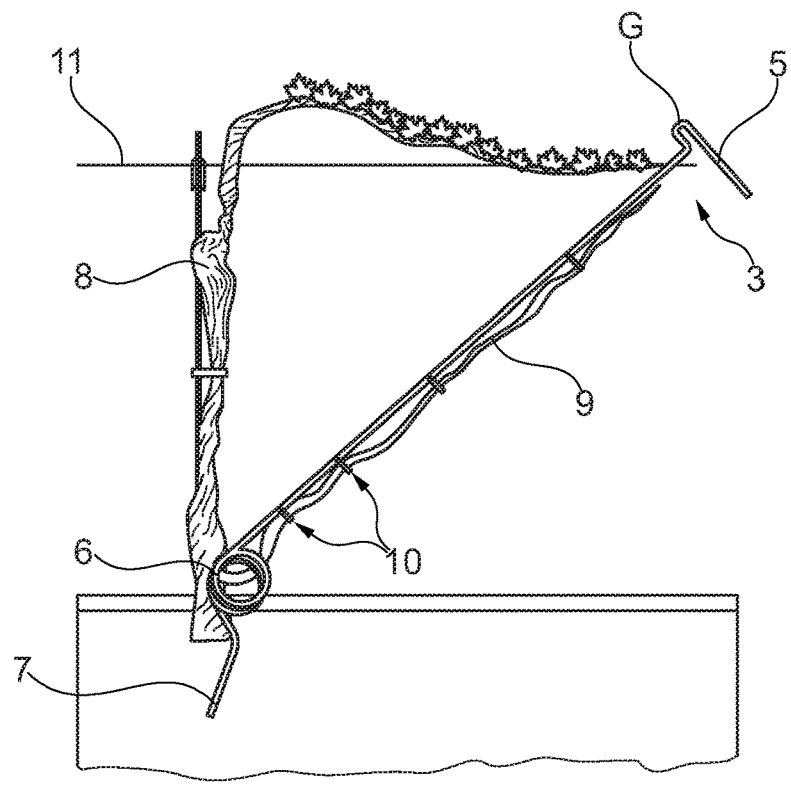
FIG. 2 illustrates a schematic side view of a part of the vineyard that employs the movable stake of FIG. 1 for supporting the branches.

Also in the case of the restoration procedure, which returns the plant to the initial conditions of FIG. 2, the use of a movable stake 1 enables the operator to carry out a safer restoration procedure and to shorten the time required. In particular, the restoration procedure does not require the operators to use any tools.

The invention claimed is:

1. A method to handle one or more branches in a plant cultivation by burying at least a part of the one or more branches, the method comprising:
   coupling the one or more branches to a movable stake comprising a deformable element, the deformable element having (i) a first free end comprising a hook and (ii) a second end anchored to a ground;
   during a cold season, burying the one or more branches in the ground by rotating the one or more branches together with the deformable element to engage the first free end in the ground and then covering the one or more branches and the deformable element with earth; and
   while in a warm season, digging out the one or more branches together with the deformable element from the earth covering them and hooking the one or more branches to a horizontal plant cultivation supporting wire by rotating the one or more branches together with the movable stake so that the first free end engages the plant cultivation supporting wire by way of the hook.

2. The method to handle one or more branches in a plant cultivation as in claim 1, wherein the movable stake, together with the one or more branches, is anchored to the ground by inserting into the ground the deformable element by a harpoon which terminates the free end.

3. The method to handle one or more branches in a plant cultivation as in claim 1, wherein the one or more branches are fastened to the movable stake by means of laces.

* * * * *